(12) United States Patent
Lewis et al.

(10) Patent No.: US 6,718,445 B1
(45) Date of Patent: Apr. 6, 2004

(54) SYSTEM AND METHOD FOR PERFORMING DYNAMIC BUFFER MANAGEMENT IN AN HFS (HIERARCHICAL FILE SYSTEM DF/SMS)

(75) Inventors: Cecilia Carranza Lewis, San Jose, CA (US); Jeffrey Allen Berger, San Jose, CA (US); David Levish, San Jose, CA (US); W. James Kincaid, Pebble Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,796

(22) Filed: Mar. 26, 1999

(51) Int. Cl.[7] ........................ G06F 12/00; G06F 13/00
(52) U.S. Cl. ........................ 711/159; 711/170; 710/56
(58) Field of Search ................ 710/2, 52, 56, 710/310; 711/159, 170; 713/100

(56) References Cited

U.S. PATENT DOCUMENTS

| | | | | |
|---|---|---|---|---|
| 5,675,797 A | * | 10/1997 | Chung et al. | 709/104 |
| 5,781,801 A | * | 7/1998 | Flanagan et al. | 710/56 |
| 5,813,042 A | * | 9/1998 | Campbell et al. | 711/159 |
| 5,838,994 A | * | 11/1998 | Valizadeh | 710/56 |
| 5,862,409 A | * | 1/1999 | Yoshimoto et al. | 395/877 |
| 5,867,663 A | * | 2/1999 | McClure et al. | 709/234 |

OTHER PUBLICATIONS

Guo–Liang Wu et al., A Buffer Allocation Scheme for ATM Networks: Complete Sharing Based on Virtual Partition, Dec. 1995, vol. 3, No. 6.*

* cited by examiner

*Primary Examiner*—Reginald G. Bragdon
*Assistant Examiner*—Pierre M. Vital
(74) *Attorney, Agent, or Firm*—Kunzler & Associates

(57) ABSTRACT

The present invention provides a system and method for dynamic management of buffers by the buffer manager for a hierarchical file system. A system according to the present invention includes a buffer pool which is comprised of both fixed and virtual storage. The buffer pool is logically partitioned into three states, fixed, pageable and released, wherein each of the plurality of buffers in the buffer pool exists in one of these states. The system further comprises the buffer manager, which dynamically manages the buffers in the system by moving them between these three states in a non-disruptive manner based on a comparison between the actual usage of fixed and virtual storage compared with target usage values for the fixed and virtual storage.

19 Claims, 3 Drawing Sheets

SYSTEM AND METHOD FOR PERFORMING DYNAMIC BUFFER MANAGEMENT IN AN HFS (HIERARCHICAL FILE SYSTEM DF/SMS)

BACKGROUND OF THE INVENTION

1. Field of the Invention

The present invention relates to buffer management in a computer file system and more particularly to a system and method for managing buffers in a hierarchical file system.

2. Description of the Prior Art

In computer systems, buffers are typically needed for Input/Output (I/O) operations. A computer operating system may consist of different components for managing I/O buffers, virtual storage and real storage. Buffer management systems often run on such operating systems that support virtual memory. The functions of a buffer management system are many and complex, one of which is the interactions of a buffer manager with the operating system components that manage virtual storage and physical memory.

In operating systems that support virtual memory, a page or segment of memory may be in one of several states:

(1) A virtual page may be in a pageable state. This means that the page contains valid data. If the operating system chooses to reuse the physical storage that the page occupies, it must be paged out to external storage. If the page is later referenced, then it must be paged in and given a physical storage page to use.

(2) A virtual page may be fixed in storage. I/O operations require that a buffer must reside in fixed storage. This means that the page contains valid data and may not be paged out at the operating system's discretion. A pageable buffer must be page fixed prior to the start of an I/O, using a costly operating system service. When an I/O completes, to make a buffer pageable again, or to "unfix" it, another costly operating system service is invoked. Page fix and page unfix operations tend to be relatively expensive, in terms of CPU time and in terms of system serialization which may prevent concurrent page fix/unfix operations in a multi-processor environment. Various techniques may be employed to minimize the use of these services.

(3) A virtual page may be unbacked or released (for the purpose of this disclosure, the two terms are interchangeable). This means that the virtual address of the page is valid, but the page has never been used or has been designated as no longer containing data that is of any use. A page in this state does not need to be written out to external storage, i.e. paged out, if the physical storage it occupies is needed for other use. Also if it has already been paged out, the slot it occupies on external storage may be reused and a reference to the virtual address will not result in an I/O operation to bring the page into physical memory, i.e. a page-in. Such a page will not occupy any storage if it has never been used, or if its prior location has been reclaimed. In all cases, however, the virtual address remains valid.

Pools of buffers are defined so that buffers may be shared among different files and different users. If different size buffers are needed for different purposes, then multiple pools may be used. Often there is a software component dedicated to the management of buffers—a buffer manager. A sophisticated system may consist of multiple buffer managers which operate on behalf of different data base subsystems. Different buffer management systems must compete for storage resources, in which case the underlying operating system acts as the supervisor.

Large buffer pools are used to help reduce the frequency of I/O, but large pools require large amounts of memory. Excessively large pools can result in excessive paging which degrades performance. The presence of independent buffer managers coexisting and competing under the same operating system image complicates matters since independent buffer managers are unaware of each other. Sometimes a system administrator or data base administrator is given the ability to act as the policeman, to tune the system by specifying the size of the various buffer pools.

To avoid the excessive use of the expensive page fix and unfix operations, a buffer manager may fix some buffers at initialization using user input or some internally derived value to control the amount of permanently fixed storage. The buffer manager will then fix the pages belonging to all the buffers in a specified address range during initialization. The fixed buffers use physical memory that is taken away from the system's pool of pageable storage. If the buffer manager takes too much, it may impact the rest of the system, causing excessive paging. Also, if the buffer manager fixes too many buffers, physical memory may go unused due to minimal use of buffers. If too few or no buffers are permanently fixed in storage, system performance may be degraded through increased use of the services to fix and unfix buffers and by increased page-ins when buffers are used.

Both the total buffer pool size and the partition of buffers into fixed and pageable buffers is usually static; that is, the partition cannot change without suspending service to users that require a buffer. Therefore, it can be seen that there is a need to provide a more dynamic non-disruptive way to modify the buffer pool size or to repartition the buffers between pageable, fixed and released states.

SUMMARY OF THE INVENTION

In order to address the shortcomings of the prior art described above, it is an object of the present invention to improve the performance and efficiency of a buffer management system in operating systems that supports virtual memory.

It is a further object of the invention to provide a buffer management system that provides a more dynamic, non-disruptive way to modify the buffer pool size.

It is still a further object of this invention to partition the buffer storage into pageable and non-pageable buffers, using a partition of unbacked buffers to accommodate the expansion or contraction of the buffer pool. It is an object of the invention to allow the user to define the size of of the buffer pool and the size of the partitions. More importantly, this invention allows the user to dynamically modify the size of the pool and partitions without causing any disruption of service to applications that require use of the buffer pool.

These and other objects and advantages are attained in accordance with the present invention which provides a buffer management system that includes a buffer. pool which is comprised of both fixed and virtual storage. The buffer pool is logically partitioned into three states, fixed, pageable and released, wherein each of the plurality of buffers in the buffer pool exists in one of these states. The system further comprises the buffer manager, which dynamically manages the buffers in the system by moving them between these three states based on a comparison between the actual usage of fixed and virtual storage compared with target usage values for the fixed and virtual storage.

The system of the present invention further includes a buffer index table, where each entry represents one buffer in the pool. The index table entries contain information about the state of the buffer and an index designating the next buffer in the list.

An advantage of the system of the present invention is that the buffer pool size can be changed dynamically as system conditions dictate, so there is no need for suspending service to users that require a buffer.

This, as well as other additional objects, features and advantages of the present invention will become apparent in the following detailed written description.

BRIEF DESCRIPTION OF THE DRAWINGS

The following description is the best embodiment presently contemplated for carrying out the present invention. This description is made for the purpose of illustrating the general principles of the present invention and is not meant to limit the inventive concepts claimed herein.

DETAILED DESCRIPTION OF THE PRESENT EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. If is further appreciated that those skilled in the art may use different technology, terms or jargon to implement the embodiments of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1A:
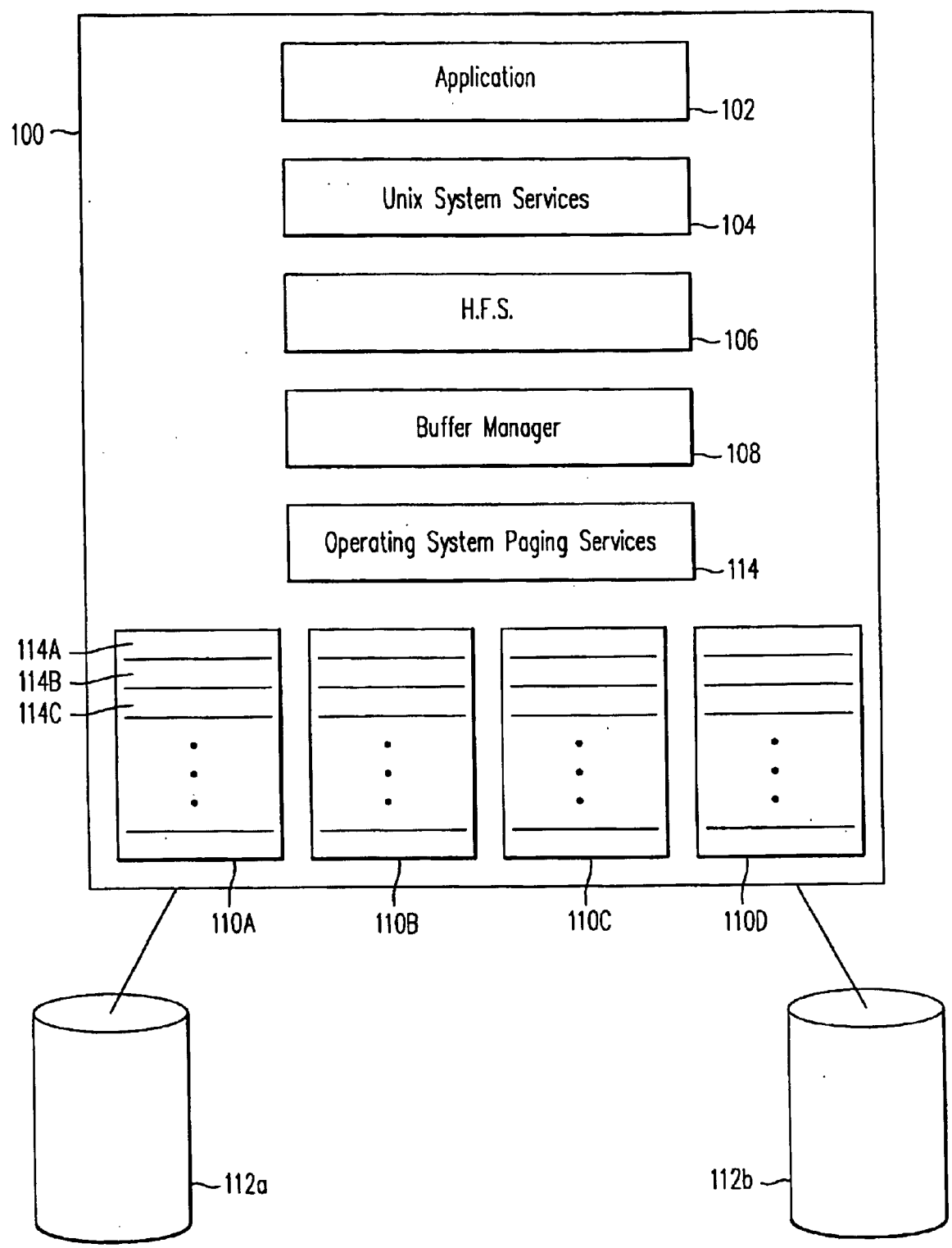
FIG. 1a is a block diagram of a computer system that may include the system and method of the present invention.

FIG. 1a is a block diagram which represents a computer system 100 that may include the system and method of the present invention. Computer system 100 may be a S/390 or Open System by IBM Corporation, or Unix system. Computer system 100 will typically have one or more applications 102 running in the system. In order to support system services requests from the application 102, the computer system 100 includes an open systems service, such as unix system services 104. The unix system service 104 serves as the interface between the application 102 and system service requests such as I/O. The computer system 100 further includes a hierarchical file system (HFS) 106 which is a file system which stores data in a hierarchy of secondary storage. Secondary storage could be DASD 112a and 112b. The computer system 100 further includes a buffer manager 108 to support requests from the HFS 106, and operating system services such as operating system paging services 114. For buffer manager 108 processing utilizing the operating system paging services 114, the computer system 100 will also include one or more data spaces which function as buffer pools 110A, 110B, 110C, and 110D. Buffer pools 110A, 110B, 110C, and 110D each contain a plurality of buffers, for example 114A, 114B, 114C, which may exist in one of several different states.

According to the present invention, each buffer 114A, 114,B, 114C can be in one of three states: fixed, pageable, or released. A buffer pool 110A is logically partitioned into buffers of these three states. A partition may consist of many non-contiguous address ranges. The buffer manager 108 is responsible for managing these partitions.

In the present invention, the buffer manager 108 may vary the amount of fixed and virtual storage in order to meet some target values that may be specified by the system administrator. These target values may be altered dynamically without disruption of service. The two system metrics used to keep track of the current actual size of the partitions are called TOTAL_FIXED and TOTAL_VIRTUAL. The two associated target values specifiable by the system administrator are called MAX_FIXED and MAX_VIRTUAL.

While TOTAL_FIXED consists of those buffers in the fixed state, TOTAL_VIRTUAL consists of the sum of buffers in the fixed state and pageable state. Note that TOTAL_FIXED can never exceed TOTAL_VIRTUAL. When referring to the size of the virtual buffer pool, it is said to consist only of buffers that are backed—that is, buffers that are either fixed or pageable, but not unbacked. Released (i.e. unbacked) buffers are not counted towards the virtual size, because they do not cost anything. Released buffers are used for expanding and contracting the virtual buffer pool. To decrease the size of the virtual buffer pool, the buffer manager may release some backed buffers. To increase the size of the virtual buffer pool, the buffer manager may reuse some previously released or unbacked buffers.

Buffers are used both for I/O operations and for long-term data caching. In-use buffers are either in the fixed or pageable state. However, certain buffer management events may cause a buffer to change from one state to another, referred to as a state transition. State transition decisions are based on the value of the two system metrics in relation to their respective targets. If the target values are changed, the buffer manager may dynamically alter the state of a buffer (i.e., to move from one partition to another) in order to adjust to the targets. State transitions are described in more detail below in connection with FIG. 2.

Figure 1B:
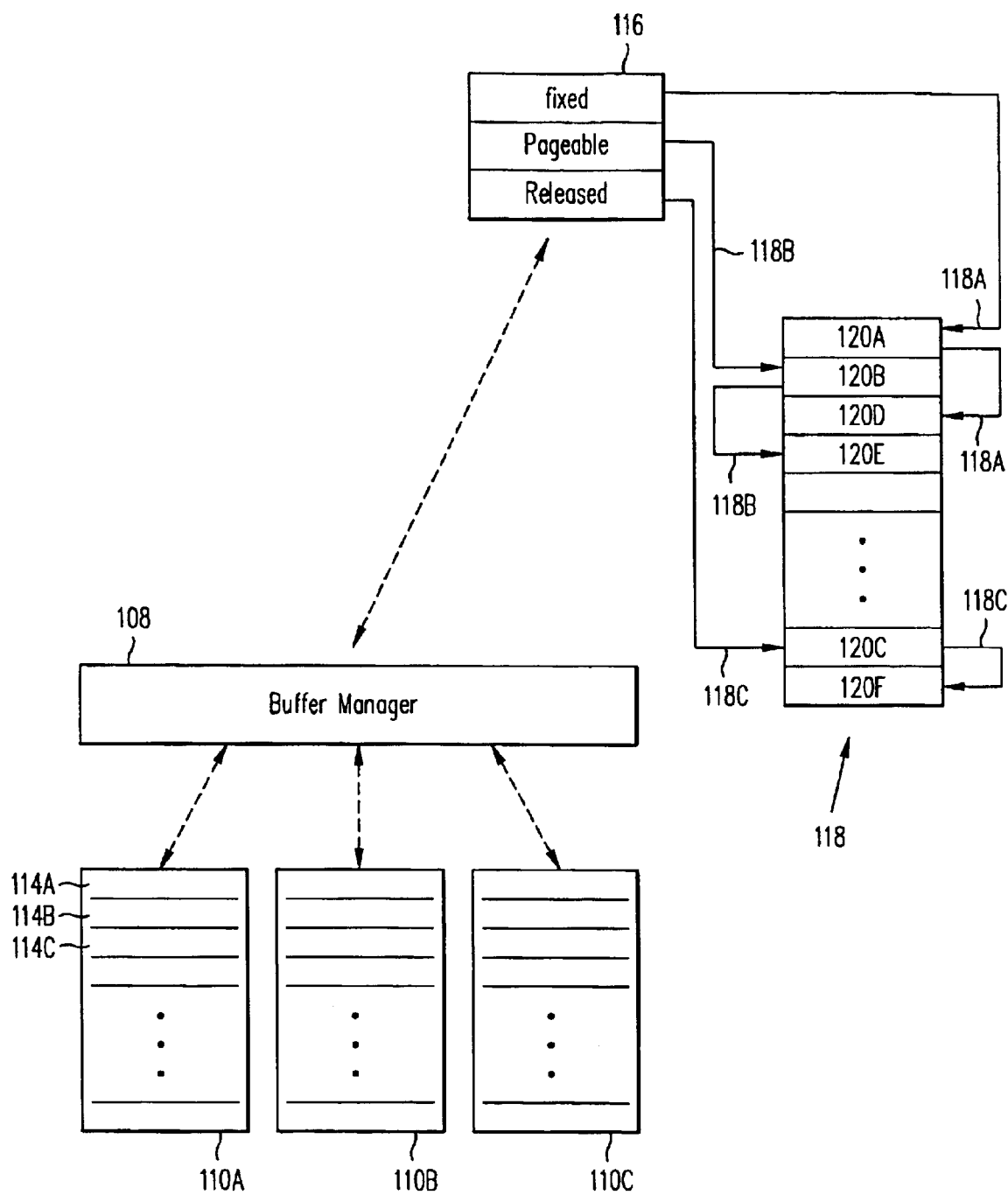
FIG. 1b is a block diagram of the buffer management system in the computer system, further illustrating the buffer pool and buffer index table.

With reference now to FIG. 1b, when a buffer is free (that is, available for use), the buffer resides on a linked list 118 which contains other buffers in the same state. The buffer manager 108 maintains three such linked lists 118A, 118B, 118C (that is, one per state). These linked lists reside in virtual storage within a structure referred to as the buffer index table 116.

The buffer index table 116 consists of a number of 32-bit contiguous entries (called buffer index elements 120A, 120B, 120C, for example) where each entry represents one buffer in the pool. The number of entries in the table is the number of buffers in the pool. In the preferred embodiment, within the 32-bit entry, 8 bits are used to contain current buffer state information and the remaining 24 bits represent an index into the buffer pool that is associated with the next buffer in the linked list. (It is possible that other implementations could adjust the number of bits used for state information and the index.)

Assuming that the indexes are relative to zero, the following formulae apply:

$$\text{Address of next index\_element} = \text{current\_index} \times 4 + \text{buffer\_index\_table\_origin}$$
$$\text{Address of current\_buffer} = \text{current\_index} \times \text{buffer\_size} + \text{buffer\_pool origin}$$

Given a buffer address, the second equation can also be used to locate its corresponding index. The use of an index to represent a buffer in the pool, as opposed to using the 32-bit virtual address of the buffer, saves space for the buffer index table. With a 24-bit index, up to 16 million (16,777,216) buffers may be represented. The use of an index assumes that all buffers in the pool are of the same size. If there are multiple buffer pools, there must be one buffer index table for each pool. In this manner, multiple buffer pools consisting of many different sizes may be managed. If there are multiple buffer pools, the metrics TOTAL_FIXED and TOTAL_VIRTUAL must be summed for all of the pools taking into account the varying buffer sizes of each pool.

For a given buffer size, we can calculate the size of the buffer index table. For example, for a 2 GB buffer pool consisting of 524,288 4K buffers, the buffer index table consumes 2 MB of virtual storage, considerably less than the 2 GB buffer pool that it represents. For a second example, for a 2 GB buffer pool consisting of 32,768 64K buffers, the buffer index table consumes only 128 KB. This does not necessarily mean that the 2 GB buffer pool or the entire index table occupies physical storage. In fact, much of the buffer pool may be "unbacked" (otherwise referred to as "released"). Also, since the buffer index table may be pageable, unused portions of it may reside in external storage.

As mentioned earlier, the linked lists 118A, 118B, 11BC only contain free buffers. When a buffer becomes "in-use", it is taken off the linked list chain on which it resides. Likewise, when this buffer is later freed, it is placed on the appropriate linked list depending on its current state which is indicated in the buffer index table.

Figure 2:
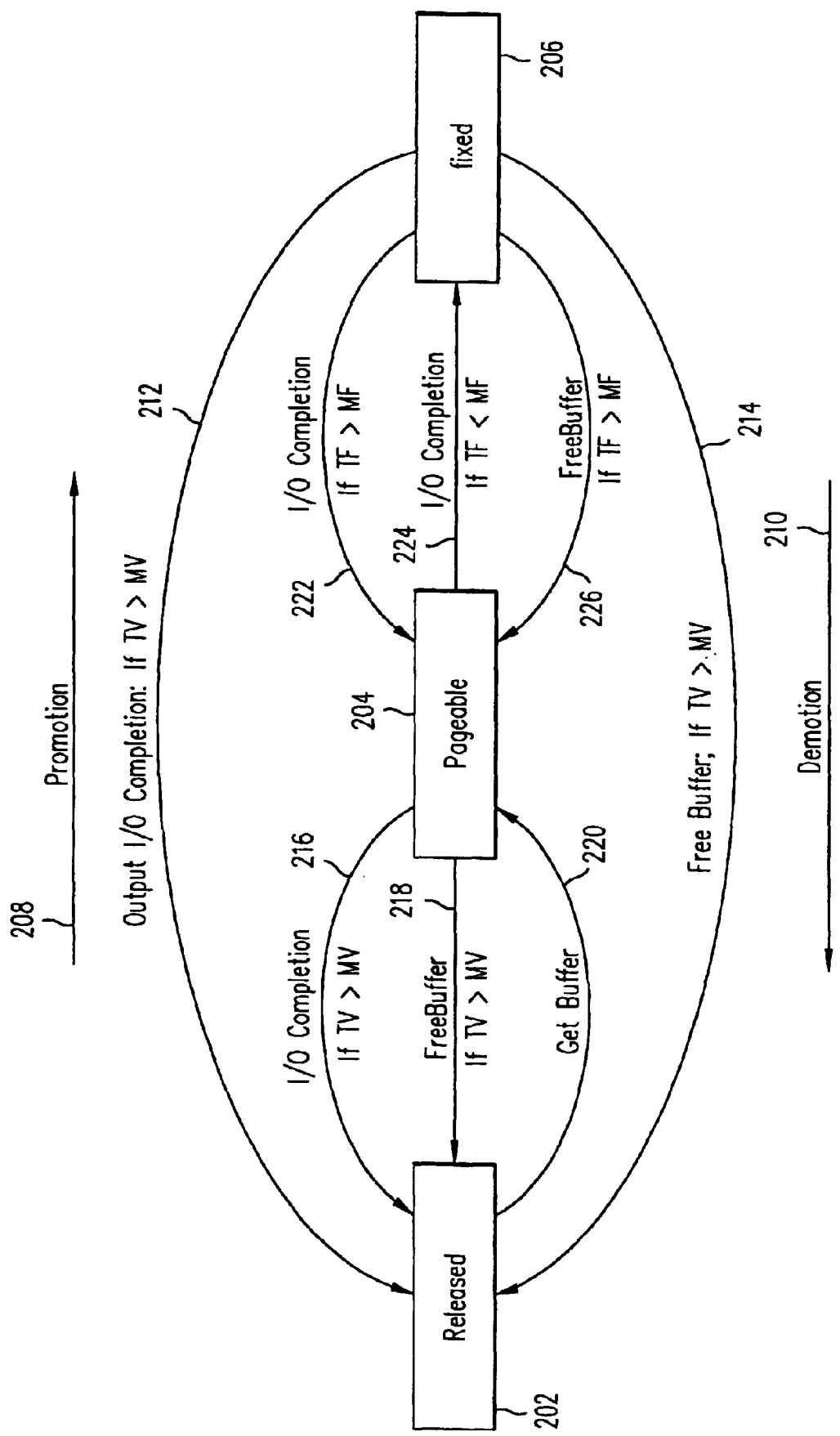
FIG. 2 is a state diagram representing the movement of buffers within the buffer pool of the present invention based on specified events.

FIG. 2 describes a state diagram. A buffer resides in one of three states: Fixed 206, Pageable 204, or Released 202. Promotion of a buffer between these states is represented by 208, demotion of a buffer between these states is represented by 210. Certain buffer management events may trigger a state change, depending on the value of the two metrics (TOTAL_FIXED and TOTAL_VIRTUAL) relative to their respective targets (MAX_FIXED and MAX_VIRTUAL). These events are: GET_BUFFER, FREE_BUFFER, and I/O Completion. Since Fixed 206, Pageable 204, and Released 202 form a hierarchical preference structure, changing a buffer from Released 202 to Pageable 204, or from Pageable 204 to Fixed 206, is called a "promotion"; changing a buffer from Fixed 206 to any other state, or from Pageable 204 to Released 202, is called a "demotion".

The function of GET_BUFFER is to acquire a new buffer from one of the free buffer linked lists. Its first preference is to acquire a buffer from the free Fixed chain 226; if one is available, no state change occurs. If no free Fixed buffers are available, the second preference is to acquire a buffer from the free Pageable chain; if one is available, no state change occurs. If no free Fixed or Pageable buffers are available, the third preference is to acquire a buffer from the Released chain, provided that TOTAL_VIRTUAL does not already exceed MAX_VIRTUAL. This requires the promotion from the Released state to the Pageable state 220, and since no physical storage is associated with this buffer, there is a cost associated with this promotion to allocate some physical storage. In the preferred embodiment of this invention, the cost is deferred; if the buffer is to be used for a read I/O operation, physical storage is allocated when the buffer is page fixed; if the buffer is to be used for writing data, a page fault (resulting from storing into the buffer) will allocate the physical storage. If there are no free buffers and TOTAL_VIRTUAL exceeds MAX_VIRTUAL, the fourth preference is to steal an "in-use" buffer which may have been used for long-term caching. Buffer stealing is discussed briefly below, but it is not generally the subject of the present invention. Finally, if there are no free buffers and there are no eligible buffers to be stolen, then the user's request for a buffer fails.

The function of FREE_BUFFER is to free a buffer whose contents are no longer required. FREE_BUFFER will place the buffer on the appropriate free chain depending on its state. Before placing the buffer on the free chain, FREE_BUFFER must check to see if a demotion is necessary. If TOTAL_FIXED exceeds MAX_FIXED and the buffer is in the Fixed state, the buffer is unfixed and demoted to the Pageable state. If TOTAL_VIRTUAL exceeds MAX_VIRTUAL or if the buffer has been paged out, then the buffer must be demoted to the Released state by releasing the physical storage for the buffer. However, before releasing the storage, if the buffer is in the Fixed state, FREE_BUFFER must also unfix the buffer.

I/O Initiation page fixes a buffer that is not in the Fixed state, but no state change takes place at this time. I/O Completion handles many possible state changes. Upon the completion of an I/O, the buffer is always fixed even though the buffer may be in the Pageable state. For both read and write I/O operations, if the buffer was in the Pageable state and TOTAL_FIXED is below MAX_FIXED, the buffer is promoted to the Fixed state and the buffer is not unfixed 224. Also for both read and write operations, if the buffer was in the Fixed state and TOTAL_FIXED exceeds MAX_FIXED, the buffer is unfixed and demoted to the Pageable state 222. In the preferred embodiment of the present invention, write I/O operations may cause the buffer to be demoted to the Released state if TOTAL_VIRTUAL exceeds MAX_VIRTUAL 218. (Note that a buffer which has just been read into cannot be released, because an application has requested the data. However, after a write, the application is not likely to need the buffer contents anymore.)

The preferred embodiment of the present invention adds an extra feature to GET_BUFFER, not shown in the state transition diagram because it doesn't involve a state transition, though it does play a role in reducing the cost of paging. This feature requires that the operating system provide an inexpensive way for the buffer manager to test whether a page resides in physical memory, such as the TPROT instruction in IBM's OS/390 operating system. If MAX_VIRTUAL is set too high relative to the amount of available physical storage, the paging subsystem may cause a Pageable buffer to be paged-out, meaning that the buffer no longer exists in physical storage. A reference to this page will result in a page-in operation, which is needlessly costly if the contents of the buffer are no longer needed, a cost which can be avoided by releasing the buffer. The page-out operation is itself costly (and could have been avoided if MAX_VIRTUAL were not so high), but it would compound the cost if the buffer manager needlessly paged-in the buffer. When GET_BUFFER acquires a buffer from the Pageable chain for use as an output buffer and if the buffer has been paged-out, in order to avoid a page-in operation, GET_BUFFER will release the buffer.

A method according to the present invention may be further described by the following algorithm of each event that can trigger a change in buffer state, which is readily understood in connection with the state diagram of FIG. 2.

```
GET_BUFFER
  If Fixed available then
    get Fixed
  Else
    If Pageable available then
      get Pageable
    Else
      get Released (promotes
      from Released to Pageable).
I/O COMPLETION
  If Pageable then
    If TOTAL_FIXED<MAX_FIXED then
      Promote from Pageable to Fixed
      Exit I/O Completion
    Else remain Pageable
  Else (buffer must be Fixed)
    If TOTAL_FIXED>MAX_FIXED then
      Unfix the buffer
      Demote from Fixed to Pageable
    Else remain Fixed
    If Output and TOTAL_VIRTUAL>MAX_VIRTUAL then
      Unfix the buffer (if still Fixed)
      Release the buffer
      Demote to released
    Else leave the state unchanged FREE BUFFER
  If Pageable then
    If TOTAL_VIRTUAL>MAX_VIRTUAL or buffer is
      paged out then
      Release the buffer
      Demote from Pageable to Released
    Else remain Pageable
  Else (must be Fixed)
    If TOTAL_FIXED>MAX_FIXED then
      Unfix the buffer
      Demote from Fixed to Pageable
    If TOTAL_VIRTUAL>MAX_VIRTUAL then
      Unfix the buffer (if still Fixed)
      Release the buffer
      Demote to Released
    Else remain Fixed
```

The state transitions are an effective method of reacting to changes in the MAX_FIXED and MAX_VIRTUAL targets provided that the buffer manager continues to remain active—that is, there is continued service demand. However, in the event that the buffer manager becomes dormant (i.e. no service demand occurs), in order to force the buffer manager to release the physical memory that it might be consuming, or to prevent dormant pageable buffers from being paged out, the buffer manager will immediately attempt to release its storage when MAX_FIXED or MAX_VIRTUAL is reduced.

In some cases, TOTAL_VIRTUAL may drift above its target MAX_VIRTUAL to meet demand, but ideally this should not happen. In order to prevent TOTAL_VIRTUAL from exceeding MAX_VIRTUAL when demand gets heavier than MAX_VIRTUAL allows, a buffer steal algorithm must be employed. Thus, by limiting the value of MAX_VIRTUAL, the system administrator may limit the amount of virtual storage consumed by the buffer manager even though demand is high. Limiting MAX_VIRTUAL may have the effect of increasing the frequency of file I/O, but it is done to limit or prevent paging which is more expensive than file I/O. MAX_VIRTUAL should be set high or low depending on whether or not other buffer managers (or any other applications that are large consumers of physical storage) might coexist with the buffer manager described in this invention, and depending on the relative importance of the different applications.

Fixed buffers can be employed to minimize CPU utilization and to minimize serialization on locks pertaining to the management of physical memory. This benefits the system as a whole, not just the users of the buffer manager. MAX_FIXED should probably be kept small relative the amount of physical memory. Since the buffer manager should fix buffers only on demand, TOTAL_FIXED will continue to be smaller than MAX_FIXED if MAX_FIXED is large and demand is always small. Unless MAX_VIRTUAL is large relative to the amount of physical memory, it is recommended that MAX_FIXED be set equal to MAX_VIRTUAL.

This invention applies to buffer management systems which attempt to maintain a supply of "free buffers"—that is, buffers that are available for reuse and are considered equal with respect to age. By definition, an LRU algorithm steals the least recently used buffer. That is, the LRU chain dictates which buffer to steal when a request needs a new buffer. In the algorithm described in this invention, there is a GET_BUFFER routine which first tries to allocate a buffer from a chain of "free" buffers. This invention focuses on the management of these free buffers. Only if there are no free buffers will GET_BUFFER attempt to steal a buffer, but this invention does not concern itself with how to steal a buffer, or any aspect of LRU algorithms. If the majority of time there are no free buffers, then this invention may become ineffective, because age criteria for buffer stealing involves a different preference ordering than the preference of fixed versus pageable buffers. HFS (Hierarchical File System) is an example of a file system which has a buffer manager that maintains lots of free buffers. In the HFS, buffers are automatically freed when their associated file is considered to be inactive. Thus, HFS tends to maintain a large supply of free buffers, so that this invention tends to have particular value to HFS.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

What is claimed is:

1. A buffer management system comprising:
   a buffer pool further comprised of an amount of fixed storage and an amount of virtual storage;
   a target maximum fixed value for the amount of fixed storage, the target maximum fixed value dynamically alterable by a system administrator;
   a target maximum virtual value for the amount of virtual storage, the target maximum virtual value dynamically alterable by a system administrator; and
   a buffer manager for dynamically varying the amount of fixed storage and the amount of virtual storage based on a comparison of present usage of the amount of fixed storage and the amount of virtual storage to target maximum fixed and target maximum virtual values.

2. The buffer management system of claim 1, wherein the buffer pool is further comprised of fixed, pageable and released logical partitions and each of the buffers in the buffer pool resides in a state comprising one of said logical partitions.

3. The buffer management system according to claim 2, further comprising a buffer index table further comprising buffer index elements wherein each entry represents one buffer in the buffer pool.

4. The buffer management system according to claim 3, wherein said buffer index elements further comprise a buffer state information field which represents the logical partition where the buffer resides and a pointer field to the next available buffer in the same state within the buffer pool.

5. The buffer management system of claim 2, wherein the buffer manager is further configured to dynamically vary the amount of fixed storage and the amount of virtual storage by moving buffers in the buffer pool between the logical partitions.

6. The buffer management system of claim 1, further comprising means for testing whether a buffer resides in physical memory.

7. The buffer management system of claim 1, further comprising a comparator configured to compare present usage of the amount of fixed storage and present usage of the amount of virtual storage to the target maximum fixed value and the target maximum virtual value.

8. The buffer management system of claim 1, wherein the fixed storage is configured for memory paging and the virtual storage is configured for memory paging.

9. An article of manufacture comprising:
   a buffer pool further comprised of an amount of fixed storage and an amount of virtual storage;
   a target maximum fixed value for the amount of fixed storage, the target maximum fixed value dynamically alterable by a system administrator;
   a target maximum virtual value for the amount of virtual storage; the target maximum virtual value dynamically alterable by a system administrator, and
   a buffer manager for dynamically varying the amount of fixed storage and the amount of virtual storage based on a comparison of present usage of the amount of fixed storage and the amount of virtual storage to target maximum fixed and target maximum virtual values.

10. The article of manufacture according to claim 9, wherein the buffer pool is further comprised of fixed, pageable and released logical partitions.

11. The article of manufacture according to claim 10, further comprising a buffer index table further comprising buffer index elements wherein each entry represents one buffer in the buffer pool.

12. The article of manufacture according to claim 11, wherein said buffer index elements further comprise a buffer state information field which represents the logical partition where the buffer resides and a pointer field to the next available buffer in the same state within the buffer pool.

13. The article of manufacture of claim 9, further comprising means for testing whether a buffer resides in physical memory.

14. A buffer management system for an operating environment which supports both fixed and virtual storage comprising:
   a buffer pool comprising a plurality of buffers logically partitioned into three states, fixed, pageable and released, said buffer pool further comprising both fixed storage configured for memory storage and virtual storage configured for memory paging;
   a target maximum fixed value for the fixed storage, the target maximum fixed value dynamically alterable by a system administrator;
   a target maximum virtual value for the virtual storage, the target maximum virtual value dynamnically alterable by a system administrator; and
   a buffer manager comprising system target usage values for said fixed and virtual storage and a comparator for comparing actual fixed virtual usage values to target usage values, wherein said buffer manager varies the amount of fixed and virtual storage used by moving buffers in said buffer pool between said logical partitions.

15. The buffer management system of claim 14, further comprising a buffer index table further comprising buffer index elements wherein each entry represents one buffer in the buffer pool.

16. The buffer management system of claim 15, wherein said buffer index elements further comprise a buffer state information field which represents the logical partition where the buffer resides and a pointer field to the next available buffer in the the same state within the buffer pool.

17. An article of manufacture comprising a program storage medium readable by a processor and embodying one or more instructions executable by a processor to implement an operating environment which supports both fixed and virtual storage comprising:
   a buffer pool comprising a plurality of buffers logically partitioned into three states, fixed, pageable and released, said buffer pool further comprising both fixed storage configured for memory storage and virtual storage configured for memory paging;
   a target maximum fixed value for the fixed storage, the target maximum fixed value dynamically alterable by a system administrator;
   a target maximum virtual value for the virtual storage, the target maximum virtual value dynamically alterable by a system administrator; and
   a buffer manager comprising system target usage values for said fixed and virtual storage and a comparator for comparing actual fixed virtual usage values to target usage values, wherein said buffer manager varies the amount of fixed and virtual storage used by moving buffers in said buffer pool between said logical partitions.

18. The article of manufacture of claim 17, further comprising a buffer index table further comprising buffer index elements wherein each entry represents one buffer in the buffer pool.

19. The article of manufacture of claim 18, wherein said buffer index elements further comprise a buffer state information field which represents the logical partition where the buffer resides and a pointer field to the next available buffer in the the same state within the buffer pool.

* * * * *

UNITED STATES PATENT AND TRADEMARK OFFICE
CERTIFICATE OF CORRECTION

PATENT NO. : 6,718,445 B1
DATED : April 6, 2004
INVENTOR(S) : Cecilia Carranza Lewis et al.

It is certified that error appears in the above-identified patent and that said Letters Patent is hereby corrected as shown below:

Column 2,
Line 60, "a buffer. pool which" should read -- a buffer pool which --

Column 3,
Line 41, "invention. If is" should read -- invention. It is --

Column 4
Line 7, "services requests" should read -- service requests --

Column 7,
Line 29, "relative the" should read -- relative to the --

Signed and Sealed this

Fourteenth Day of June, 2005

JON W. DUDAS
*Director of the United States Patent and Trademark Office*

(12) EX PARTE REEXAMINATION CERTIFICATE (5170th)
United States Patent
Lewis et al.

(10) Number: US 6,718,445 C1
(45) Certificate Issued: Aug. 2, 2005

(54) SYSTEM AND METHOD FOR PERFORMING DYNAMIC BUFFER MANAGEMENT IN AN HFS (HIERARCHICAL FILE SYSTEM DF/SMS)

(75) Inventors: Cecilia Carranza Lewis, San Jose, CA (US); Jeffrey Allen Berger, San Jose, CA (US); David Levish, San Jose, CA (US); W. James Kincaid, Pebble Beach, CA (US)

(73) Assignee: International Business Machines Corporation, Armonk, NY (US)

Reexamination Request:
No. 90/007,134, Oct. 14, 2004

Reexamination Certificate for:
Patent No.: 6,718,445
Issued: Apr. 6, 2004
Appl. No.: 09/280,796
Filed: Mar. 26, 1999

(51) Int. Cl.$^7$ .......................... G06F 12/00; G06F 13/00
(52) U.S. Cl. .......................... 711/159; 711/170; 710/56
(58) Field of Search ................... 711/159, 170; 710/2, 52, 56, 310; 713/100

(56) References Cited

U.S. PATENT DOCUMENTS

| | | |
|---|---|---|
| 5,247,660 A | 9/1993 | Ashcraft et al. ............. 395/600 |
| 5,454,103 A | 9/1995 | Coverstion et al. ......... 395/600 |
| 5,717,951 A | 2/1998 | Yabumoto ................... 395/831 |

Primary Examiner—Kevin L. Ellis

(57) ABSTRACT

The present invention provides a system and method for dynamic management of buffers by the buffer manager for a hierarchical file system. A system according to the present invention includes a buffer pool which is comprised of both fixed and virtual storage. The buffer pool is logically partitioned into three states, fixed, pageable and released, wherein each of the plurality of buffers in the buffer pool exists in one of these states. The system further comprises the buffer manager, which dynamically manages the buffers in the system by moving them between these three states in a non-disruptive manner based on a comparison between the actual usage of fixed and virtual storage compared with target usage values for the fixed and virtual storage.

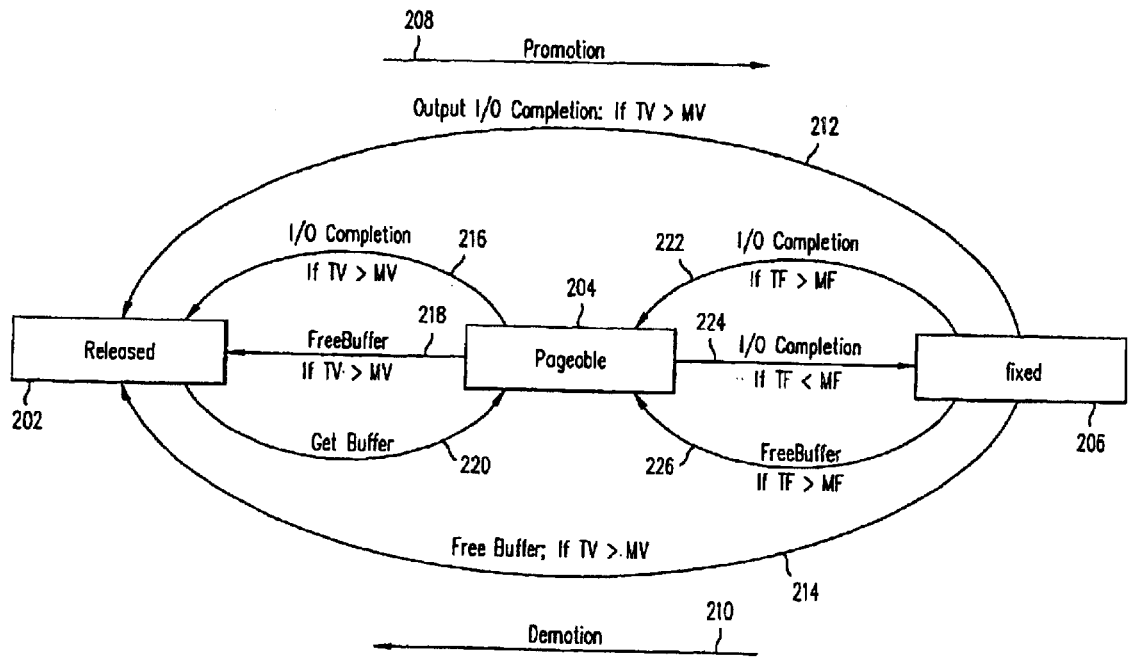

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *